United States Patent [19]

Schmid et al.

[11] Patent Number: 4,706,567
[45] Date of Patent: Nov. 17, 1987

[54] EXPLOSIVE CHARGES

[75] Inventors: Hermann Schmid; Per Sjöberg, both of Karlskoga; Leif Svensson, Karlshamn, all of Sweden

[73] Assignee: Nobel Kemi AB, Karlskoga, Sweden

[21] Appl. No.: 876,446

[22] Filed: Jun. 20, 1986

[30] Foreign Application Priority Data

Jun. 20, 1985 [SE] Sweden .............................. 8503080-7

[51] Int. Cl.$^4$ .............................................. F42B 3/00
[52] U.S. Cl. .................................... 102/318; 102/319; 102/321; 102/332; 102/284; 102/290; 149/19.4
[58] Field of Search ............... 102/312, 313, 318, 303, 102/304, 319, 321, 332, 284, 289, 290; 149/19.4

[56] References Cited

U.S. PATENT DOCUMENTS

| 4,072,702 | 2/1978 | Huskins | 149/19.4 X |
| 4,216,039 | 8/1980 | Pierce | 149/19.4 X |
| 4,280,407 | 7/1981 | Allen et al. | 89/1.14 X |
| 4,354,433 | 10/1982 | Owen | 102/310 X |
| 4,619,201 | 10/1986 | Romer et al. | 102/292 X |

*Primary Examiner*—Peter A. Nelson
*Attorney, Agent, or Firm*—Pollock, Vande Sande & Priddy

[57] ABSTRACT

The disclosure relates to a method for producing charges for explosive jointing of large-diameter pipes such as pipelines. According to the invention, such charges are formed in that a strip-shaped flat explosive is wound and joined together to form a circular ring of even thickness consisting of a plurality of closely abutting layers.

26 Claims, 2 Drawing Figures

EXPLOSIVE CHARGES

TECHNICAL FIELD

The present invention relates to a method of producing annular explosive charges for explosive jointing of large-diameter pipes such as pipelines, and to charges produced according to the method.

BACKGROUND ART

Explosive jointing may be effected by explosive welding or by some type of shrink joint. As a rule, explosive jointing of large-diameter pipes such as pipelines is effected using interiorly placed annular charges which act against an exteriorly placed support or abutment. In order to provide a completely satisfactory joint, the charges must abut quite closely to the inner surface of the pipe. Minor deviations from circular configuration in the pipe may, in such operations, be compensated for in that the charge is made elastically deformable. However, the requirement of a special charge diameter for each pipe diameter remains, as well as the requirement of a good connection between the outside of the charge and the inner surface of the pipe. Moreover, the fact that the charge may not be so elastically deformable that it fails to be self-supporting may result in the situation that standard charges cannot always be used in such pipes whose dimensional tolerances lie at the extreme margins of accepted tolerance ranges for the pipe in question. Of necessity, the dimensional tolerances for such large-diameter pipes as pipelines are quite broad. Hence, a plurality of different charge dimensions for one and the same type of pipe may be necessary, and this, of course, increases costs.

The standard method within the prior art for producing such annular charges intended for explosion welding has been to cast the charges. This is quite a circumstantial procedure if the intention is to produce a plurality of charges of different, but relatively similar, accurately specified outer diameters.

OBJECT OF THE PRESENT INVENTION

The object of the present invention is to offer a practical and versatile method of producing such annular charges by winding a strip-shaped elastically deformable (flexible) flat explosive to form a circular ring of uniform thickness and consisting of a plurality of closely mutually superposed and suitably joined layers of desired outer diameters.

If, in this operation, the strip-shaped flat explosive is wound, its ends must be bevelled. One method of directly producing such strip-shaped flat explosive which is bevelled at its ends is to cast the explosive in a horizontal mold which is progressively shallower towards its ends. The inclination of the shallow sloping in the mold must, in this instance, be equal, at one end, to the thickness of the flat explosive divided by the outer periphery of the currently contemplated charge, and at the other end equal to the thickness of the flat explosive divided by the inner periphery of the currently contemplated charge. Besides, casting in a horizontal mold is probably the best method of producing the flat explosives of the type under consideration here. In this operation, the mold is suitably interiorly coated with silicon or teflon. In this mold, which may be provided with an interlay so as directly to provide the desired strip width (which, however, may also be realized by other suitable means, such as by cutting of a large flat explosive panel), the explosive is cast mixed with a suitable binder which, at the same time, reduces the VOD (velocity of detonation) of the charge, a high-density filler to increase the density of the charge, and gas blisters in the form of gas-filled microspheres of glass or plastic to reduce the critical diameter of the charge and guarantee reliable total initiation, and possibly also a surface-active agent such as lecithine to increase the flow properties of the mixture. Another method of improving the flow properties of the mold mixture so that it flows out to a horizontal layer of uniform thickness in the mold is to employ particulate components as explosive and filler, with a carefully adapted particle size distribution.

Concerning other general data relating to charges for explosive jointing of metals, reference is made to our own co-pending Swedish patent application "Explosive charge and a method for its production" SE pat. appln. No. 8503079-9.

As has been mentioned above, the charge should contain a binder. This should be a polymer binder which hardens at room temperature and permits casting of charges. The binder may not have any negative effect on the explosive by an uncontrollable exothermic curing process and must, in the hardened state, impart to the charge density flexibility such as sufficient elasticity and self-bearing properties. As a rule, a content of approx. 50 percent polymer binder should give the desired properties.

Explosives suitable for explosive jointing are primarily pentyl, but also TNT, octogene, hexogene and ammonium nitrate could probably be employed.

According to one preferred variation of the present invention, use is made of a polyurethane-based binder system comprising of one of the di-isocyanates disclosed below or their isomeric mixtures (ration 1:1) and a polyhydroxy compound on a ε-caprolacton basis.

In the physical application of the method according to the present invention, use may be made, as polyisocyanates, of unitary substances or mixtures thereof. The polyisocyanates must have at least two NCO groups. Polyisocyanates with up to six NCO groups may also be employed. The polyisocyanates may have aliphatic, cyclo-aliphatic, araliphatic, aromatic or heterocyclic molecular structure.

As examples of appropriate polyisocyanates, the following might be mentioned:

2,4-toluene di-isocyanate; and
2,6-toluene di-isocyanate or their isomeric mixtures: diphenylene methane-4,4-di-isocyanate, diphenyl dimethyl methane-4,4-di-isocyanate, triphenyl-4,4,4-tri-isocyanate, phenylene-1,4-di-isocyanate-2,2,6,6-tetramethyl diphenyl methane-4,4-di-isocyanate, diphenyl-4,4-di-isocyanate, diphenyl ether-4,4-di-isocyanate or their halogen substituted derivates: 2,6-di-isopropylene-1,3-di-isocyanate, m-xylene-di-isocyanate, p-xylene-di-isocyanate, tetramethyl-p-xylene-di-isocyanate, dimers of toluene-2,4-di-isocyanate, cyclohexane-1,4-di-isocyanate, 1,2,3,4,5,6-hexahydrodiphenyl methane-4,4-di-isocyanate, naphthalene-1,5-di-isocyanate.

Instead of the above-mentioned isocyanates, a multiplicity of additional products with isocyanate end groups may be employed. These additional products are manufactured in such a manner that a polyhydroxy compound is reacted with polyisocyanate in such a ratio that there will be obtained at least two isocyanate groups per molecule in excess. In certain cases, the excess of isocyanate groups may amount to six per molecule.

The polyhydroxy compounds usable for the manufacture according to the present invention may be summarized under the heading of polyethers. These polyethers may, in their nature, be based on aliphatic or aromatic molecular structures. The number of hydroxy groups per molecule available for the reaction with the polyisocyanates may vary between from two to six. As examples of such compounds, mention might be made of those as are manufactured from aliphatic dioles, trioles, tetroles, pentoles and hexoles, as well as aliphatic diamines as initiators. These aliphatic polyoles and diamines are suitably straight chains containing from two to six carbon atoms. By an addition of ethylene oxide, propylene oxide or tetrahydrofurane to the initiators, there will be obtained two to six functional products with molecular weights varying between 100 and 10,000. These above-described polyethers are aliphatic compounds. However, for producing the mold compositions according to the present invention, use may advantageously also be made of polyethers on an aromatic basis with five or six-linked rings. Examples of such compounds are reaction products between ethylene oxide, propylene oxide and tetrahydrofurane, respectively, and di-hydroxy-diphenylene urethane, di-hydroxy-diphenylene propane, di-hydroxy-diphenyl or di-hydroxy-hydantoin.

These aromatic polyethers may be embraced in the following general formulae:

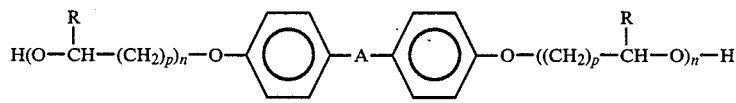

or

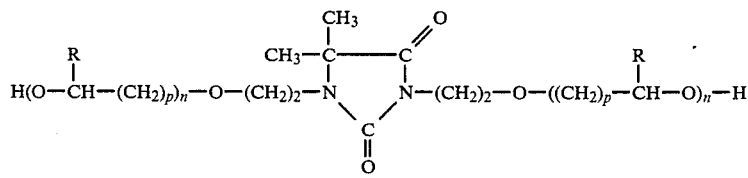

wherein A designates a single binding, —CH₂— or $$-\underset{\underset{CH_3}{|}}{\overset{\overset{CH_3}{|}}{C}}-$$

and p = 1 and R = H or CH₃
p = 3 and R = H
and n = 1–5

The molecular weight of these compounds lies between 300 and 800. These above-described compounds react with polyisocyanates by polyaddition.

The following systems are usable thanks to their low viscosity, low exotherm and long pot life.

Isophorone-di-isocyanate, (3-isocyanatomethyl-3,5,5-trimethyl cyclohexyl-isocyanate).

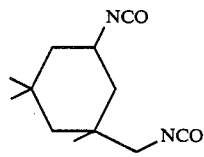

-continued
or 2,2,4-trimethyl hexamethylene di-isocyanate

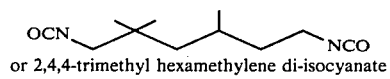

or 2,4,4-trimethyl hexamethylene di-isocyanate

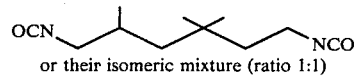

or their isomeric mixture (ratio 1:1)

The NCO content for these isocyanates should lie between 30 and 40%.

As polyhydroxy compounds, use is preferably made of polyethers on an ε-caprolactone basis.

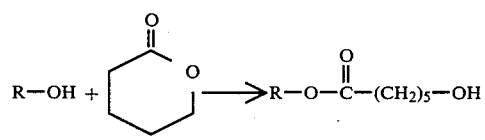

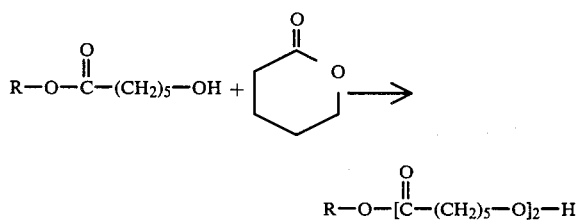

wherein R— may be any OH-terminated compound whatever. However, the condition is that the OH group must be primary.

Functionality
2 functional:   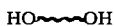

3 functional:   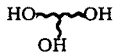

| Functionality | |
|---|---|
| 4 functional: | 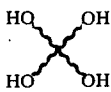 |

Polyesters suffer from the drawback that they are often highly-viscous, brittle and give a rapid and high temperature elevation on polymerization.

Low-viscous polyester systems contain hazardous monomers. The catalyst types used for polymerization of polyesters are inhibited by nitro compounds and nitrate esters. Consequently, polyesters are unsuitable for this purpose.

On the other hand, silicons which have elastic properties may be used, at least in certain cases. Moreover, these harden completely at room temperature without rapid exotherms. On the other hand, their price level is clearly disadvantageous as compared with isophorone-based polyurethane systems. Moreover, viscosity is often higher for silicon systems. Nor is silicon as strong as polyurethane systems. On the other hand, epoxy resins cannot, as a rule, be employed, since the catalysts are often incompatible with explosive.

The structure of the charge

In order to attain a sufficient degree of cohesion, the different layers of the charge should be glued to one another. This may either be effected using a separate glue or by utilizing the polymer binder. In the first case, the glue surfaces may, for example, be coated with a curing polyurethane which contains an excess of polyol. In the second case, the hardening of the polymer binder may be delayed in its surface layer facing the mold. This may be effected, for example, by coating the inside of the mold with a certain type of silicon rubber which has a hardening inhibiting effect on polyurethane.

The gluing of the different layers to one another may also be utilized to divide up the charge by means of inert layers which reduce the VOD of the charge. The charge may also be reinforced by glass fiber matting or other material in conjunction with the molding of the charge.

BRIEF DESCRIPTION OF THE DRAWINGS

The nature of the present invention and its aspects have been defined in the appended claims. Referring to the drawings, FIG. 1 shows a first variant of the present invention with a plurality of concentric layers of strip-shaped flat explosive, while

DESCRIPTION OF THE PREFERRED EMBODIMENT

On the figures, reference No. 1 designates flat explosive, 2 glue joints and 3 an outer reinforcement and/or buffer; and 4 a tamping. A suitable thickness for the flat explosive contemplated here may be from 3 to 10 mm.

Manufacturing example

The following components and amounts were mixed:

| | |
|---|---|
| Isophoron di-isocyanate: | 15% |
| Polyol: | 30% |
| Pot life > 1 hour | |
| Coarse-grained pentyl: | 24% |
| Fine-grained pentyl: | 6% |
| Glass microspheres: | 3% |
| Zinc powder: | 21.5% |
| Lecithine | 0.5% |

The components were mixed in vacuum in a planetary-type mixer at 10 mm Hg.

Thereafter, the composite mass was poured onto a silicon-coated substrate. Silicon of the condensation type was employed.

Figure 1:
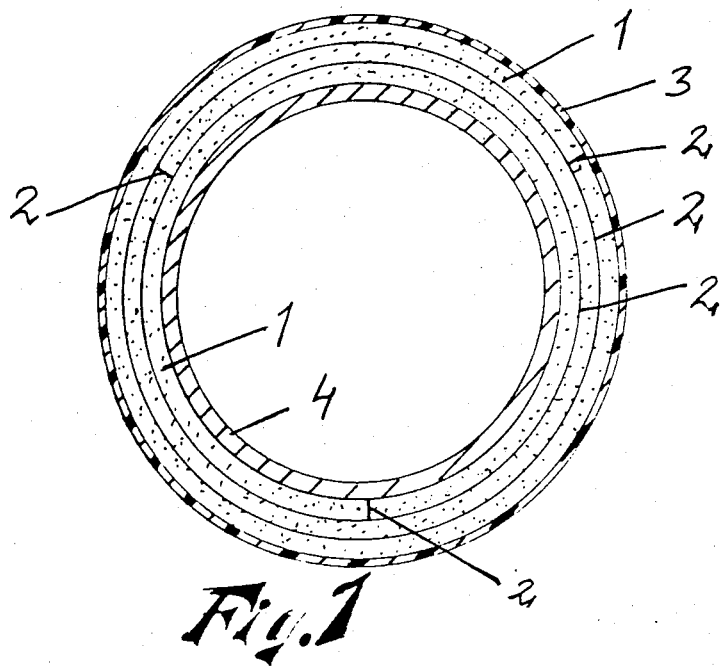
Figure 2:
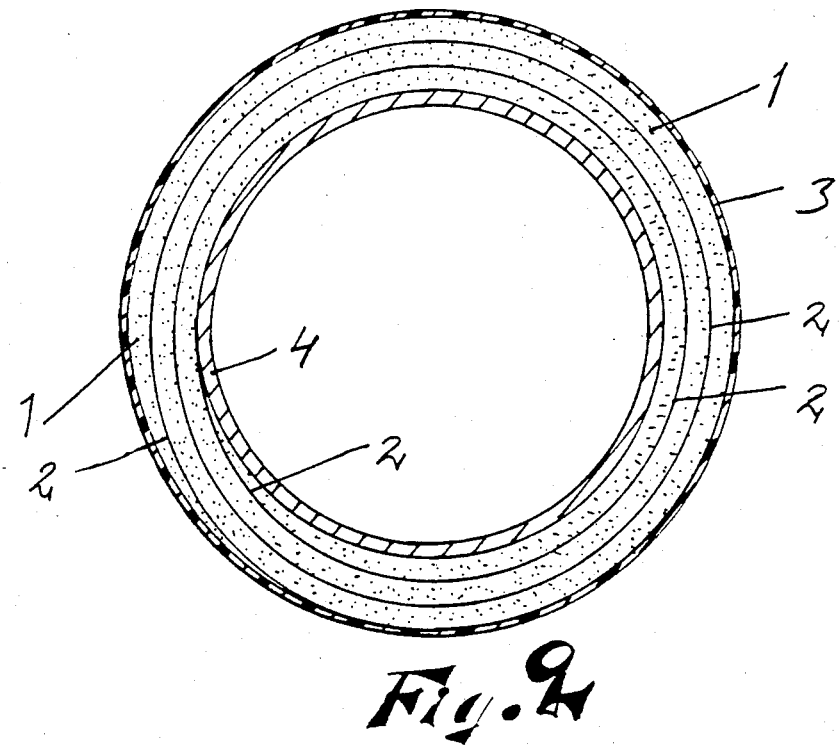
FIG. 2 shows another type of charge produced from helically-wound layers of strip-shaped flat explosives.

After 12 hours, the panel was removed from the mold. Its underside was tacky as has been mentioned above. Pieces were cut out from the panel and were then glued together to form an annular charge according to FIG. 2. This charge was subsequently employed as a patented explosive welding charge.

The flat explosive was so elastic that it could be bent to a curvature of 20 mm without cracking.

What we claim and desired to secure by Letters Patent is:

1. A method of producing annular charges for explosive jointing of large-diameter pipes which comprises winding and joining strip-shaped, elastically deformable, flat explosive to form a circular ring of plural layers of uniform thickness having the desired outer diameter and thus forming a plurality of closely abutting layers to thereby produce said annular charges.

2. A method as claimed in claim 1, which comprises winding the strip-shaped flat explosive in a plurality of continuous superposed layers.

3. The method as claimed in claim 1, which comprises winding the strip-shaped flat explosive in a plurality of annular, concentrically disposed layers.

4. The method as claimed in claim 1, which comprises winding the different layers of strip-shaped flat explosive on a matrix.

5. The method as claimed in claim 2, characterized in that the flat explosive is bevelled at its ends prior to the winding operation.

6. The method as claimed in claim 1, which comprises gluing the different layers to one another.

7. The method as claimed in claim 1, which comprises applying inert layers in the joints between the different layers of strip-shaped flat explosive.

8. An annular charge for explosive jointing of large-diameter pipes charge characterized in that it consists of a strip-shaped flat explosive wound to form a circular ring of uniform thickness and containing a high-energy explosive selected from the group of TNT, pentyl, octogene, hexogene and ammonium nitrate; metal or metal oxide powder; microspheres and a polymer binder based on one of the following di-isocyanates:
Isophoron di-isocyanate
2,2,4-trimethyl hexamethylene di-isocyanate
2,4,4-trimethyl hexamethylene di-isocyanate
or their isomeric mixtures (ratio 1:1) and with an NCO content of between 30 and 40%,
and an Σ-caprolacton-based polyether.

9. The method as claimed in claim 2, which comprises winding the different layers of strip-shaped flat explosive on a matrix.

10. The method as claimed in claim 2, which comprises winding the different layers of strip-shaped flat explosive on a matrix.

11. The method as claimed in claim 2, which comprises gluing the different layers to one another.

12. The method as claimed in claim 3, which comprises gluing the different layers to one another.

13. The method as claimed in claim 4, which comprises gluing the different layers to one another.

14. The method as claimed in claim 5, characterized in that the different layers are glued to one another; and that the finished charge is possibly reinforced by glass fiber fabric or the like glued thereon.

15. The method as claimed in claim 2, which comprises applying inert layers in the joints between the different layers of strip-shaped flat explosive.

16. The method as claimed in claim 3, which comprises applying the inert layers in the joints between the different layers of strip-shaped flat explosive.

17. The method as claimed in claim 4, which comprises applying inert layers in the joints between the different layers of strip-shaped flat explosive.

18. The method as claimed in claim 5, which comprises applying inert layers in the joints between the different layers of strip-shaped flat explosive.

19. The charge of claim 8 wherein said explosive is in the form of a plurality of continuous superposed layers.

20. The charge of claim 8 wherein said explosive is in the form of a plurality of continuous annular concentrically disposed layers.

21. The method of claim 1 which comprises winding said flat explosive in complete turns.

22. The method of claim 6 which further comprises gluing glass fiber or glass fabric on the charge for reinforcement.

23. The method of claim 11 which further comprises gluing glass fiber or glass fabric on the charge for reinforcement.

24. The method of claim 12 which further comprises gluing glass fiber or glass fabric on the charge for reinforcement.

25. The method of claim 13 which further comprises gluing glass fiber or glass fabric on the charge for reinforcement.

26. The method of claim 14 which further comprises gluing glass fiber or glass fabric on the charge for reinforcement.

* * * * *